(12) United States Patent
Srivatsa et al.

(10) Patent No.: US 8,352,946 B2
(45) Date of Patent: Jan. 8, 2013

(54) MANAGING MIGRATION READY QUEUE ASSOCIATED WITH EACH PROCESSOR BASED ON THE MIGRATION READY STATUS OF THE TASKS

(75) Inventors: Vaddagiri Srivatsa, Bangalore (IN); Manish Gupta, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 613 days.

(21) Appl. No.: 12/539,018

(22) Filed: Aug. 11, 2009

(65) Prior Publication Data

US 2011/0041131 A1 Feb. 17, 2011

(51) Int. Cl.
*G06F 9/46* (2006.01)
(52) U.S. Cl. ......... 718/102; 718/103; 718/104; 718/105
(58) Field of Classification Search .................. 718/102, 718/103, 104, 105, 107
See application file for complete search history.

(56) References Cited

U.S. PATENT DOCUMENTS

| | | | | |
|---|---|---|---|---|
| 6,213,652 | B1 * | 4/2001 | Suzuki et al. | 358/1.15 |
| 6,728,959 | B1 | 4/2004 | Merkey | |
| 6,779,182 | B1 * | 8/2004 | Zolnowsky | 718/103 |
| 7,870,553 | B2 * | 1/2011 | Kissell | 718/102 |
| 7,913,257 | B2 * | 3/2011 | Nishikawa | 718/102 |
| 8,069,444 | B2 * | 11/2011 | Fedorova | 718/102 |
| 2008/0244588 | A1 * | 10/2008 | Leiserson et al. | 718/102 |
| 2009/0031315 | A1 * | 1/2009 | Inoue et al. | 718/102 |

OTHER PUBLICATIONS

Beitz et al, Optimizing Hetrogeneous Task migration in the Gardens virtual cluster computer, 2000, IEEE, pp. 1-7.*
Gulati et al., Multitasking workload scheduling on flexible core chip multiprocessors, 2008, ACM SIGARCH computer architecture news, pp. 46-55.*
Sarkar et al., Push-Assisted migration of Real-time tasks in multi-core processors, 2009, LCTES'09, pp. 80-89.*
Thread Migration to Improve Synchronization Performance, Sridharan Srinivas et al., Available at http://www.nd.edu/~surendar/papers/OSIHPA06.pdf.
Lindsley Rick, Kernel Korner—What's New in the 2.6 Scheduler?, Available at http://www.linuxjournal.com/article/7178.

(Continued)

*Primary Examiner* — Thomas Lee
*Assistant Examiner* — Abu Z Ghaffari
(74) *Attorney, Agent, or Firm* — Gibb & Riley, LLC

(57) ABSTRACT

The present disclosure is directed to a method for managing tasks in a computer system having a plurality of CPUs. Each task in the computer system may be configured to indicate a migration ready indicator of the task. The migration ready indicator for a task may be given when the set of live data for that task reduces or its working set of memory changes. The method may comprise associating a migration readiness queue with each of the plurality of CPUs, the migration readiness queue having a front-end and a back-end; analyzing a task currently executing on a particular CPU, wherein the particular CPU is one of the plurality of CPUs; placing the task in the migration readiness queue of the particular CPU based on status of the task and/or the migration ready indicator of the task; and selecting at least one queued task from the front-end of the migration readiness queue of the particular CPU for migration when the particular CPU receives a task migration command.

9 Claims, 2 Drawing Sheets

Method for Managing Tasks

OTHER PUBLICATIONS

Mark S. Squillante, et al., Analysis of task migration in shared-memory multiprocessor scheduling, Joint International Conference on Measurement and Modeling of Computer Systems archive, Proceedings of the 1991 ACM SIGMETRICS conference on Measurement and modeling of computer systems table of contents, San Diego, California, United States, pp. 143-155, Year of Publication: 1991,ISBN:0-89791-392-2 Available at http://portal.acm.org/citation.cfm?id=107971.107987&CFID=34056105&CFTOKEN=29516414.

* cited by examiner

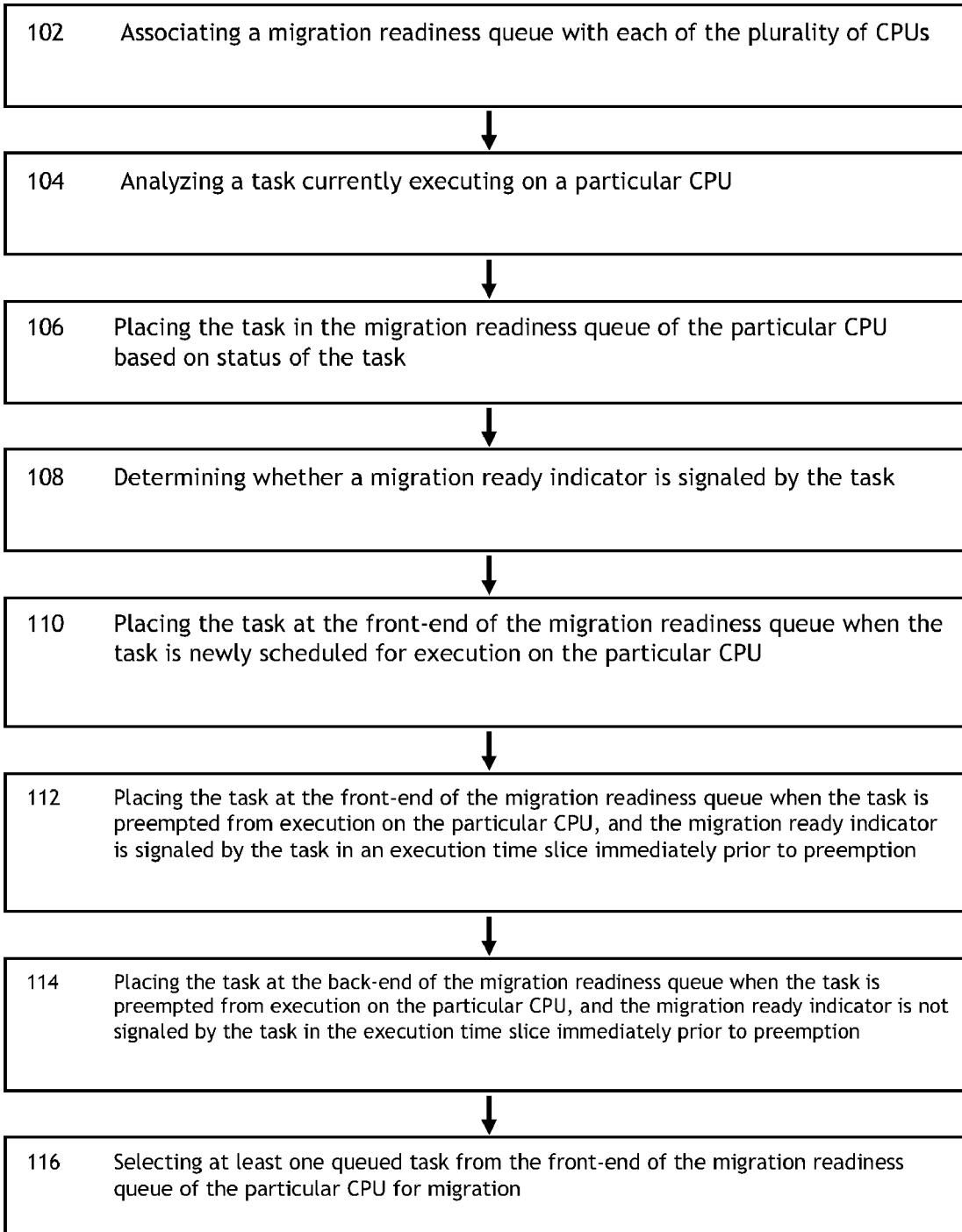
FIG. 1 – Method for Managing Tasks

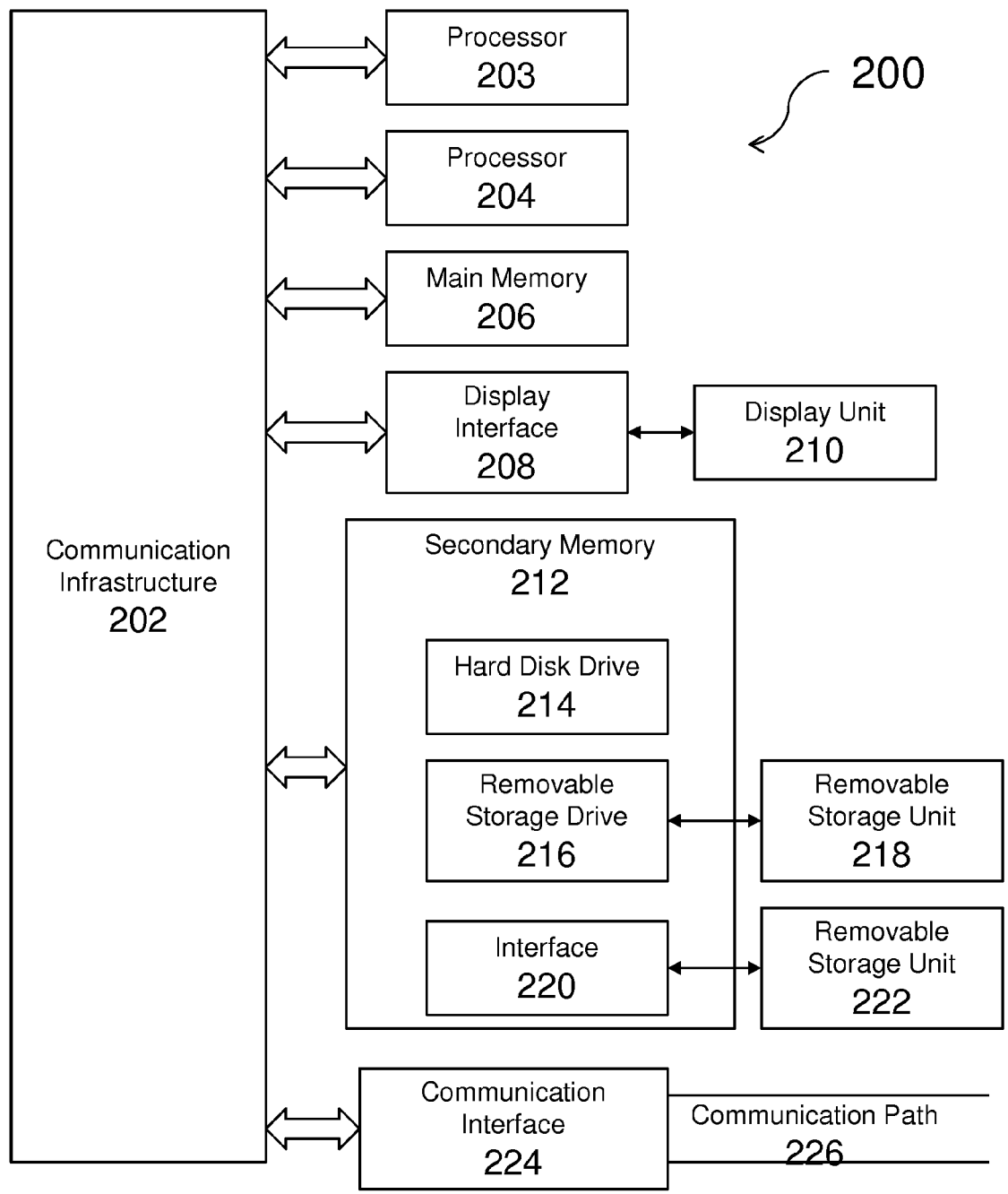
FIG. 2 – Data Processing System

MANAGING MIGRATION READY QUEUE ASSOCIATED WITH EACH PROCESSOR BASED ON THE MIGRATION READY STATUS OF THE TASKS

TECHNICAL FIELD

Embodiments of the invention generally relates to the field of resource allocation, and more particularly to managing tasks in a computer system having a plurality of processor units.

BACKGROUND

Typically, a central processing unit (CPU, hereinafter also referred to as a processor) scheduler in a computer system is responsible for allocating CPU cycles to various tasks. The complexity of the CPU scheduler may increase on systems having more than one CPU. In such systems, the scheduler may need to manage tasks across multiple CPUs. An approach is to provide a global run queue. Each CPU may be configured to pull tasks from the global run queue when the CPU needs to schedule a task. A disadvantage of this approach is that requests from multiple CPUs may result in causing contention on the global run queue.

An alternative approach is to split the global run queue into several run queues, possibly one run queue for each CPU. Each CPU may refer to its own queue when it needs to schedule tasks. A disadvantage of this approach is the increased complexity for the scheduler to ensure that the tasks placed in the run queues are balanced, which may require the scheduler to periodically monitor the load on each run queue and relocate the tasks among the multiple run queues when necessary.

The inventors have recognized a need for an improved means of managing tasks in a computer system having a plurality of CPUs.

SUMMARY

Embodiments of the invention are directed to a system and method for managing tasks in a computer system having a plurality of CPUs. Each task in the computer system may be configured to indicate a migration ready indicator for the task. The migration ready indicator for a task may be given when the set of live data for that task reduces or its working set of memory changes. The system and method may comprise associating a migration readiness queue with each of the plurality of CPUs, the migration readiness queue having a front-end and a back-end; analyzing a task currently executing on a particular CPU, wherein the particular CPU is one of the plurality of CPUs; placing the task in the migration readiness queue of the particular CPU based on status of the task and/or the migration ready indicator of the task; and selecting at least one queued task from the front-end of the migration readiness queue of the particular CPU for migration when the particular CPU receives a task migration command.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure. For a better understanding of the aspects of the invention presented herein, together with other and further features and advantages thereof, reference is made to the following description, taken in conjunction with the accompanying drawings, and the scope of the invention will be pointed out in the appended claims.

BRIEF DESCRIPTION OF THE DRAWINGS

The subject matter that is regarded as embodiments of the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1 illustrates an exemplary embodiment of a flow diagram of a method 100 for managing tasks in a computer system having a plurality of CPUs; and FIG. 2 illustrates an exemplary embodiment of a data processing system 200 on which the method 100 of FIG. 1 may be implemented.

DETAILED DESCRIPTION

Reference will now be made in detail to the subject matter disclosed, which is illustrated in the accompanying drawings. It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the disclosure, as claimed, but is merely representative of selected presently preferred embodiments of the invention.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, etc. In other instances, well-known structures, materials, or operations are not shown or described in detail to avoid obscuring aspects of the embodiments of the invention. The illustrated embodiments of the invention will be best understood by reference to the drawings. The following description is intended only by way of example and simply illustrates certain selected exemplary embodiments of the invention as claimed herein.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a task executes on a particular CPU in a multi-CPU (multiprocessor) computer system, the system may fetch all memory referenced by the task into the local caches of the particular CPU. Load balancing operations in the system may request a task to be migrated to another CPU. The migration may require the system to re-fetch all memory referenced by the task on the new CPU the task migrated to, which may cause performance delays. Therefore, it is beneficial to minimize the impact on performance by choosing to migrate tasks that may have the least effect on performances.

Embodiments of the invention are directed to a system and method for managing tasks in a computer system having a plurality of central processing units (CPUs or processors). A migration readiness queue/list may be associated with each CPU. Each migration readiness queue may contain the tasks being executed on the particular CPU the queue is associated with. The tasks in each queue may be sorted based on their readiness for migration. For example, the tasks at the front-end of the migration readiness queue may be more ready to be migrated, whereas the tasks towards the back-end of the migration readiness queue may be less ready to be migrated. It is understood that the migration readiness queue may be implemented as a linked list, a queue, or any collection mechanism capable of maintaining order.

In an exemplary embodiment, the readiness of a task is determined based on the amount of memory referred to by the task. For example, a task that is newly added to a CPU, for example a task that woke up from sleep or a freshly born task, may be deemed migration ready because the task may be cache cold (with few memory references). In addition, some of the existing tasks may also be deemed migration ready as they may become less dependent on its previous memory references at certain point of execution because such memory references may no longer be live, where a memory reference is not live if the current value associated with that reference will not be read again. Thus, when a task reaches a point of execution where references to previous memory reduce substantially, the task may be seen as migration ready at this point.

For example, a web service task that periodically receives requests from clients may execute certain instructions based on each request received. Each time the web service task executes a new request, it is possible that the web service no longer needs to refer to any memory associated with the old requests. Therefore, the memory reference of this task may reduce dramatically at the end of the old request execution and at the beginning of the new request execution. In such a case, it may be beneficial for the web service task to signal a hint (migration ready indicator) to the operating system (OS) and/or the CPU scheduler. The migration ready indicator signaled by a task suggests that the task's working memory set has reduced or changed and hence its migration to any other cpu will have least impact on its performance.

The OS and/or the CPU scheduler may record the time when the migration ready indicator is signaled by a task. The actual readiness of the task may be determined based on whether the migration ready indicator is signaled and the time the signal is recorded. For example, for a CPU that supports preemption of tasks, if a task signals a migration ready indicator during a first execution time slice, when this task is preempted, the task may be deemed migration ready because the migration ready indicator is signaled and the signal is recorded in an execution time slice that is immediately prior to the preemption. If, however, the same task is executed again on the CPU (a second execution time slice) without signaling any migration ready indicator during the second time slice, the task may not be deemed migration ready when the task is preempted at the end of the second time slice, because the task may have built-up memory reference during the execution in the second time slice. Therefore, the readiness determination for an existing (non-newly added) task may rely on whether the task signaled a migration ready indicator in the time slice immediately prior to the preemption of the task.

FIG. 1 illustrates an exemplary embodiment of a flow diagram illustrating steps performed by a method 100 in accordance with the present disclosure. Step 102 associates a migration readiness queue with each of the plurality of CPUs. For each CPU in the system, step 104 analyzes the tasks executing on the particular CPU and step 106 places the tasks in the migration readiness queue of the particular CPU. Step 108 determines whether a migration ready indicator is signaled by the task. The migration ready indicator is an indicator (hint) provided by the task/application to an operating system or a task scheduler of the particular CPU. The migration ready indicator may indicate that the task is migration-ready when the set of live data referenced by the task reduces or a working set of memory of the task changes.

The ordering of a task in the migration readiness queue may be adjusted based on the status of the task. If the task is newly scheduled for execution on the particular CPU (for example the task is a new-born or just work up from sleep or just migrated from another cpu), step 110 places the task at the front-end of the migration readiness queue. If the task is preempted (de-scheduled) from execution on the particular CPU, and the migration ready indicator is signaled by the task in an execution time slice immediately prior to the preemption, step 112 places the task at the front-end of the migration readiness queue and clears the migration-ready indicator for the task. If the task is preempted from execution on the particular CPU, and the migration ready indicator is not signaled by the task in the execution time slice immediately prior to the preemption, step 114 places the task at the back-end of the migration readiness queue.

When a CPU receives a task migration command (e.g., for load balancing purposes) to migrate a certain number of tasks from this CPU to another CPU, step 116 may select the certain number of queued tasks from the front-end of the migration readiness queue of this CPU. Selecting more migration ready tasks to migrate to another CPU may reduce the performance delays caused by memory re-fetching and lead to overall improvement in performance of the system.

FIG. 2 illustrates a block diagram of an exemplary data processing system 200, for example a computing system such as a desktop computer, laptop computer, PDA, mobile phone and the likes, that can be used for implementing exemplary embodiments of the present invention. Data processing system 200 includes one or more processors, for example processor 204 as illustrated in FIG. 2. Processor 204 is coupled to a communication infrastructure 202 (for example, a communications bus, cross-over bar, or network). Various software embodiments are described in terms of this exemplary data processing system. After reading this description, it will become apparent to a person of ordinary skill in the relevant art(s) how to implement the invention using other data processing systems and/or computer architectures.

Exemplary data processing system 200 can include display interface 208 that forwards graphics, text, and other data from the communication infrastructure 202 (or from a frame buffer not shown) for display on display unit 210. Data processing system 200 also includes main memory 206, which can be random access memory (RAM), and may also include secondary memory 212. Secondary memory 212 may include, for example, hard disk drive 214 and/or removable storage drive 216, representing a floppy disk drive, a magnetic tape drive, an optical disk drive, etc. Removable storage drive 216 reads from and/or writes to removable storage unit 218 in a manner well known to those having ordinary skill in the art. Removable storage unit 218, represents, for example, a floppy disk, magnetic tape, optical disk, etc. which is read by and written to by removable storage drive 216. As will be appreciated, removable storage unit 218 includes a computer usable storage medium having stored therein computer software and/or data.

In exemplary embodiments, secondary memory 212 may include other similar means for allowing computer programs or other instructions to be loaded into the computer system. Such means may include, for example, removable storage unit 222 and interface 220. Examples of such may include a program cartridge and cartridge interface (such as that found in video game devices), a removable memory chip (such as an EPROM, or PROM) and associated socket, and other removable storage units 222 and interfaces 220 which allow software and data to be transferred from removable storage unit 222 to data processing system 200.

Data processing system 200 may also include a communications interface 224. Communications interface 224 allows software and data to be transferred between the data processing system and any other external devices. Examples of communications interface 224 may include a modem, a network interface (such as an Ethernet card), a communications port, a PCMCIA slot and card, etc. Software and data transferred via communications interface 224 are typically in the form of signals which may be, for example, electronic, electromagnetic, optical, or other signals capable of being received by communications interface 224. These signals are provided to communications interface 224 via communications path (that is, channel) 226. Channel 226 carries signals and may be implemented using wire or cable, fiber optics, a phone line, a cellular phone link, an RF link, and/or other communications channels.

The terms "computer program medium," "computer usable medium," and "computer readable medium" are used to generally refer to media such as main memory 206 and secondary memory 212, removable storage drive 216, and a hard disk installed in hard disk drive 214. Computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It can be used, for example, to transport information, such as data and computer instructions, between computer systems.

Computer programs (also called computer control logic) are typically stored in main memory 206 and/or secondary memory 212. Computer programs may also be received via communications interface 224. Such computer programs, when executed, can enable the computer system to perform the features of exemplary embodiments of the invention as discussed herein. In particular, computer programs, when executed, enable processor 204 to perform the features of data processing system 200. Accordingly, such computer programs represent controllers of the data processing system.

In accordance with the exemplary embodiments disclosed, the system and methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

The flowchart and/or block diagram(s) in the Figure(s) described herein illustrate the architecture, functionality, and/or operation of possible implementations of systems, methods, and/or computer program products according to various embodiments of the present invention. In this regard, each block in a flowchart or block diagram may represent a module, segment, or portion of code, which comprises one or more executable instructions for implementing the specified logical function(s). It should also be noted that, in some alternative implementations, the functions noted in a flowchart or block diagram may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in a flowchart or block diagram can be implemented by special purpose hardware-based systems that perform the specified functions or acts, or combinations of special purpose hardware and computer instructions.

The corresponding structures, materials, acts, and equivalents of any means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The exemplary embodiment(s) were chosen and described in order to explain the principles of the present invention and the practical application, and to enable others of ordinary skill in the art to understand the present invention for various embodiments with various modifications as are suited to the particular use contemplated.

As will be appreciated by one skilled in the art, the present invention may be embodied as a system, method, and/or computer program product. Accordingly, the present invention may take the form of an entirely hardware embodiment, an entirely software embodiment (including firmware, resident software, micro-code, etc.), and/or or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider)

The present invention is described herein with reference to flowchart illustrations and/or block diagrams of methods, apparatus (systems), and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block(s)

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block(s). The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide processes for implementing the functions/acts specified in the flowchart and/or block diagram blocks.

The terminology used herein is for the purpose of describing exemplary embodiments and is not intended to be limiting of the present invention. As used herein, the singular forms "a", "an", and "the" are intended to include the plural forms as well, unless the context clearly indicates otherwise. It will be further understood that the terms "comprises", "comprising", "includes", or "including" when used in this specification, specify the presence of stated features, integers, steps, operations, elements, and/or components, but do not preclude the presence or addition of one or more other features, integers, steps, operations, elements, components, and/or groups thereof.

While exemplary embodiments of the invention have been described, it will be understood that those skilled in the art, both now and in the future, may make various improvements and enhancements which fall within the scope of the claims that follow. These claims should be construed to maintain the proper protection for the invention first described.

What is claimed is:

1. A method for managing tasks in a computer system having a plurality of central processing units (CPUs), comprising:
   associating, by the system, a migration readiness queue with each of the plurality of CPUs, the migration readiness queue having a front-end and a back-end;
   determining, by the system, a readiness of a task that is to be executed on a particular CPU based on an amount of memory to be referenced by the task, the particular CPU being one of the plurality of CPUs;
   placing, by the system, the task in the migration readiness queue of the particular CPU based on a status indicating migration ready, the status being signaled to a CPU scheduler by the task;
   when the task has the status of migration ready, being determined prior to a current execution time slice, and the task is preempted from execution during the current execution time slice, then placing, by the system, the task at the front-end of the migration readiness queue;
   when the task has the status of not migration ready, being determined prior to a current execution time slice, and the task is preempted from execution during the current execution time slice, then placing, by the system, the task at the back-end of the migration readiness queue; and
   selecting, by the system, at least one task from the front-end of the migration readiness queue associated with the particular CPU for migration, when the particular CPU receives a task migration command.

2. The method as claimed in claim 1, further comprising:
   placing the task at the front-end of the migration readiness queue when the task is newly scheduled for execution on the particular CPU.

3. The method as claimed in claim 1, indicating the status of the task as migration ready, when the amount of memory to be referenced by the task is reduced.

4. A computer system having a plurality of CPUs and a memory for managing tasks, the system comprising:
   a memory that stores tasks in a plurality of migration readiness queues; and
   said plurality of CPUs that:
      associates each migration readiness queue with each of the plurality of CPUs, the each migration readiness queue having a front-end and a back-end;
      determines a readiness of a task that is to be executed on a particular CPU based on an amount of memory to be referenced by the task, the particular CPU being one of the plurality of CPUs;
      places the task in the migration readiness queue of the particular CPU
      when the task has the status of migration ready, being determined prior to a current execution time slice, and the task is preempted from execution during the current execution time slice, then places the task at the front-end of the migration readiness queue;
      when the task has the status of not migration ready, being determined prior to a current execution time slice, and the task is preempted from execution during the current execution time slice, then places the task at the back-end of the migration readiness queue; and
      selects at least one task from the front-end of the migration readiness queue associated with the particular CPU for migration, when the particular CPU receives a task migration command.

5. The system as claimed in claim 4,
   said plurality of CPUs further placing the task at the front-end of the migration readiness queue when the task is newly scheduled for execution on the particular CPU.

6. The system as claimed in claim 4, said plurality of CPUs further indicate the status of the task as migration ready, when the amount of memory to be referenced by the task is reduced.

7. A computer program product comprising a non-transitory computer readable storage medium having computer readable program code embodied therewith, the computer readable program code performing a method for managing tasks in a computer system having a plurality of CPUs, the method comprising:
   associating a migration readiness queue with each of the plurality of CPUs, the migration readiness queue having a front-end and a back-end;
   determining a readiness of a task that is to be executed on a particular CPU based on an amount of memory to be referenced by the task, the particular CPU being one of the plurality of CPUs;
   placing the task in the migration readiness queue of the particular CPU based on a status indicating migration ready, the status being signaled to a CPU scheduler by the task;
   when the task has the status of migration ready, being determined prior to a current execution time slice, and the task is preempted from execution during the current execution time slice, then placing the task at the front-end of the migration readiness queue;
   when the task has the status of not migration ready, being determined prior to a current execution time slice, and the task is preempted from execution during the current execution time slice, then placing the task at the back-end of the migration readiness queue; and
   selecting at least one task from the front-end of the migration readiness queue associated with the particular CPU for migration, when the particular CPU receives a task migration command.

8. The computer program product as claimed in claim 7, the method further comprising placing the task at the front-end of the migration readiness queue when the task is newly scheduled for execution on the particular CPU.

9. The computer program product as claimed in claim 7, the method further indicating the status of the task as migration ready, when the amount of memory to be referenced by the task is reduced.

* * * * *